United States Patent
Shoykhet

(10) Patent No.: US 11,635,412 B2
(45) Date of Patent: Apr. 25, 2023

(54) PRESSURE DECOUPLING FLUID DRIVE UNIT FROM FLOW PATH FOR PRESSURE ADJUSTMENT OF SAMPLE ACCOMMODATION VOLUME

(71) Applicant: Agilent Technologies, Inc., Santa Clara, CA (US)

(72) Inventor: Konstantin Shoykhet, Karlsruhe (DE)

(73) Assignee: Agilent Technologies, Inc, Santa Clara, CA (US)

( * ) Notice: Subject to any disclaimer, the term of this patent is extended or adjusted under 35 U.S.C. 154(b) by 51 days.

(21) Appl. No.: 17/045,751

(22) PCT Filed: Apr. 6, 2018

(86) PCT No.: PCT/IB2018/052405
§ 371 (c)(1),
(2) Date: Oct. 6, 2020

(87) PCT Pub. No.: WO2019/193401
PCT Pub. Date: Oct. 10, 2019

(65) Prior Publication Data
US 2021/0055269 A1    Feb. 25, 2021

(51) Int. Cl.
*G01N 30/20* (2006.01)
*G01N 30/32* (2006.01)
(Continued)

(52) U.S. Cl.
CPC .............. *G01N 30/32* (2013.01); *G01N 30/20* (2013.01); *G01N 30/463* (2013.01); *G01N 2030/027* (2013.01)

(58) Field of Classification Search
CPC ................. G01N 1/2226; G01N 30/32; G01N 2030/025; G01N 2030/324; G01N 2030/027; G01N 30/20
(Continued)

(56) References Cited

U.S. PATENT DOCUMENTS

2013/0067997 A1    3/2013  Ebsen et al.
2016/0187304 A1    6/2016  Wikfors et al.

FOREIGN PATENT DOCUMENTS

CN    102460145 A    5/2012
CN    104813164 A    7/2015
(Continued)

OTHER PUBLICATIONS

International Search Report and Written Opinion dated Jan. 16, 2019; Application No. PCT/IB2018/052405; 14 pages.
(Continued)

*Primary Examiner* — Robert R Raevis

(57) ABSTRACT

An apparatus for separating a fluidic sample includes a fluid drive arrangement including fluid drive units for driving a mobile phase along a flow path to a sample separation unit, a sample accommodation volume for accommodating the fluidic sample and selectively fluidically coupleable with or decoupleable from the flow path, and a control unit. The control unit is configured to control pressure decoupling of at least part of at least one of the fluid drive units from the flow path, and enable the partially pressure-decoupled fluid drive unit(s) to pressurize the sample accommodation volume before fluidically coupling the sample accommodation volume with the flow path and/or to de-pressurize the sample accommodation volume after fluidically coupling the sample accommodation volume with the flow path for preparing a subsequent intake of fluidic sample in the sample accommodation volume.

18 Claims, 3 Drawing Sheets

(51) Int. Cl.
*G01N 30/46* (2006.01)
*G01N 30/02* (2006.01)

(58) Field of Classification Search
USPC ........ 422/89; 96/101–108; 73/863.02, 23.35, 73/23.36, 23.41, 23.42, 863.71, 864.83, 73/864.84
See application file for complete search history.

(56) References Cited

FOREIGN PATENT DOCUMENTS

| | | | |
|---|---|---|---|
| CN | 105308448 | A | 2/2016 |
| CN | 107407663 | A | 11/2017 |
| CN | 107449852 | A | 12/2017 |
| EP | 1577012 | A1 | 9/2005 |
| EP | 2677313 | A1 | 12/2013 |
| JP | 2003185646 | * | 7/2003 |

OTHER PUBLICATIONS

China Office Action and Search Report dated Feb. 7, 2023 for application No. 201880091806.2; 15 pages.

* cited by examiner

US 11,635,412 B2

PRESSURE DECOUPLING FLUID DRIVE UNIT FROM FLOW PATH FOR PRESSURE ADJUSTMENT OF SAMPLE ACCOMMODATION VOLUME

RELATED APPLICATIONS

This application is the national stage under 35 U.S.C. 371 of International Application No. PCT/IB2018/052405, filed Apr. 6, 2018, the entire contents of which are incorporated by reference herein.

BACKGROUND ART

The present invention relates to a sample separation apparatus, and a method of operating a sample separation apparatus.

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) for example via an injection needle into a sample loop for instance by a corresponding movement of a piston within a metering device. This usually occurs under a significantly smaller pressure than what the separation unit is run with. Thereafter, an injector valve is switched so as to introduce the intaken amount of fluidic sample from the sample loop of a metering path into the separation path between fluid drive unit and the separation unit for subsequent separation.

Due to the large pressure difference in the flow path between fluid drive unit and separation unit (for instance 1000 bar) on the one hand and the sample loop (for instance atmospheric pressure) on the other hand, a noticeable volume may be needed to bring the loop and the sample within it to the system pressure level resulting in a pressure break-down or a pressure dip when injecting the fluidic sample from the sample loop into the flow path. This may damage fluidic components of the sample separation apparatus or may at least reduce their life time. At the same time, the mentioned pressure artifacts may disturb the separation process.

SUMMARY

It is an object of the invention to provide a sample separation apparatus with simple and gentle intake and/or injection of sample.

According to an exemplary embodiment of the present invention, a sample separation apparatus for separating a fluidic sample is provided, wherein the sample separation apparatus comprises a fluid drive arrangement comprising a plurality of fluid drive units (such as high pressure pumps like piston pumps, for instance capable of pumping a fluid at a pressure of at least 1000 bar, in particular at least 1800 bar) for driving a mobile phase along a flow path (which may also be denoted as main path) to a sample separation unit, a sample accommodation volume configured for accommodating the fluidic sample and being configured to be selectively fluidically coupleable with the flow path or fluidically decoupleable from the flow path, and a control unit (such as one or more processors, or part of a processor) configured for controlling a pressure decoupling (or fluidic decoupling) of at least part of (for instance a complete fluid drive unit or at least one cylinder-piston unit of a plurality of cylinder-piston units comprised in a fluid drive unit may be pressure decoupled; wherein the designation "cylinder-piston unit" is not limited to a physical embodiment comprising a piston and cylinder but rather covers also other embodiments of reciprocal fluid delivery arrangements, such as membrane pumping chamber, syringe pumping units and alike) at least one of the fluid drive units from the flow path in one operation mode of the sample separation apparatus. The control unit may also be configured for enabling the at least one at least partially pressure-decoupled fluid drive unit (for instance the complete fluid drive unit or the only one cylinder-piston unit of the fluid drive unit being pressure decoupled) to pressurize the sample accommodation volume before fluidically coupling the sample accommodation volume with the flow path. Additionally or alternatively, the control unit may be configured for enabling the at least one pressure-decoupled fluid drive unit to de-pressurize the sample accommodation volume after fluidically coupling the sample accommodation volume with the flow path for preparing a subsequent intake of fluidic sample in the sample accommodation volume.

According to another exemplary embodiment, a method of operating a sample separation apparatus for separating a fluidic sample is provided, wherein the method comprises driving a mobile phase along a flow path to a sample separation unit by a fluid drive arrangement comprising a plurality of fluid drive units, accommodating the fluidic sample in a sample accommodation volume being selectively fluidically coupleable with the flow path or fluidically decoupleable from the flow path, and pressure decoupling at least part of at least one of the fluid drive units from the flow path. The method may further comprise pressurizing the fluidic sample in the sample accommodation volume by the at least one at least partially pressure-decoupled fluid drive unit, and thereafter fluidically coupling the sample accommodation volume with the flow path. Additionally or alternatively, the method may further comprise de-pressurizing the sample accommodation volume after fluidically coupling the sample accommodation volume with the flow path for (in particular in the course of) preparing a subsequent intake of fluidic sample in the sample accommodation volume.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance small mass molecules or large mass biomolecules such as proteins. Separation of a fluidic sample into fractions involves a certain separation criterion (such as mass, volume, chemical properties, etc.) according to which a separation is carried out.

In the context of this application, the term "mobile phase" may particularly denote any liquid and/or gaseous medium which may serve as fluidic carrier of the fluidic sample during separation. A mobile phase may be a solvent or a solvent composition (for instance composed of water and an organic solvent such as ethanol or acetonitrile). In an isocratic separation mode of a liquid chromatography apparatus, the mobile phase may have a constant composition over time. In a gradient mode, however, the composition of the mobile phase may be changed over time, in particular to desorb fractions of the fluidic sample which have previously been adsorbed to a stationary phase of a separation unit.

In the context of this application, the term "sample separation apparatus" may particularly denote any apparatus which is capable of separating different fractions of a fluidic sample by applying a certain separation technique, in particular liquid chromatography.

The term "separation unit" may particularly denote a fluidic member through which a fluidic sample is transferred and which is configured so that, upon conducting the fluidic sample through the separation unit, the fluidic sample will be separated into different groups of molecules or particles. An example for a separation unit is a liquid chromatography column which is capable of trapping or retarding and selectively releasing different fractions of the fluidic sample.

In the context of this application, the term "sample accommodation volume" may particularly denote a defined portion or section of a flow path, a fluidic conduit or a fluidic member (such as a fluidic valve) in which a predefined amount of fluid may be at least temporarily accommodated. In an embodiment, the fluid accommodation volumes may be sample loops fluidically connected to ports of a modulator valve. The fluid accommodation volume may be at least temporarily fluidically decoupled from a flow path or main path. By a switching mechanism, the sample accommodation volume may be first coupled to a certain location in a sample separation apparatus, while being later alternatively or additionally coupled to a different location in the sample separation apparatus.

In the context of this application, the term "pressure decoupling" of two entities (such as two fluid channels, containers or volumes) may particularly denote that the pressure values within the entities are significantly different and despite that pressure difference there is no significant fluid flow from the entity with higher pressure towards the one with lower pressure. In particular, the two entities may be considered pressure decoupled if a pressure change in one of the entities is possible without a pressure change in the other entity and without emergence of a significant fluidic flow between them.

According to an exemplary embodiment of the invention, a sample separation apparatus is provided in which pre-pressurizing (for instance from ambient pressure to system pressure) a sample accommodation volume (such as a sample loop) can be accomplished by at least one of fluid drive units otherwise used for driving a mobile phase along a flow path towards a sample separation unit for separating the fluidic sample. In a separation operation mode, the fluid drive arrangement composed of the two or more fluid drive units may drive a mobile phase (such as a solvent composition) along the flow path towards the sample separation unit such as a chromatographic separation column. However, in another operation mode, at least one of these fluid drive units can be (for instance temporarily) switched out of the flow path and can be brought in functional cooperation with and can be thereby fluidically or pressure coupled with the sample accommodation volume accommodating the fluidic sample. In the latter mentioned operation mode, the said temporarily out-coupled fluid drive unit(s) may be operated to bring the fluidic sample from a low pressure (such as ambient pressure) to a higher pressure value (for instance at least 1000 bar), preferably at or close to the system pressure at which the fluid drive arrangement drives the mobile phase along the flow path for separating the fluidic sample. By taking this measure, undesired pressure shocks may be prevented which conventionally occur when switching the pre-loaded fluidic sample on the sample accommodation volume into the flow path. Since at least one of the fluid drive units of the fluid drive arrangement for driving the mobile phase along the flow path can be pressure-decoupled from the flow path so as to fulfil the task of a pre-pressurizing pump for pre-pressurizing the fluidic sample before switching the latter into the flow path, undesired pressure shocks may be prevented without adding hardware complexity to the sample separation apparatus. In other words, at least part of the fluid drive arrangement normally used for driving the mobile phase is synergistically used as a sample accommodation volume pre-pressurizing pump. By taking this measure, a simple and compact sample separation apparatus is provided which at the same time safely prevents its components from damage or excessive wear due to pressure shocks, which increases the lifetime of the fluidic components of the sample separation apparatus and of the sample separation apparatus as a whole. During accomplishing the task of pre-pressurizing the fluidic sample before switching it into the flow path, at least one of the fluid drive units is switched out of the flow path and may be brought to a pressure value corresponding to a pressure value of the sample accommodation volume. After having been brought in fluid communication with the sample accommodation volume, the respective pressure-decoupled fluid drive unit(s) can then be activated or driven so as to increase the pressure of the sample accommodation volume to approach the pressure of the flow path. Subsequently, the pre-pressurized fluidic sample in the sample accommodation volume may be switched into the flow path without significant pressure shock or fluctuation. After having fulfilled the task of pre-pressurizing, the previously pressure-decoupled at least one fluid drive unit can be switched back into the flow path so as to contribute to the driving of the fluidic sample in the mobile phase towards the sample separation unit.

Thus, an exemplary embodiment may accomplish pre-pressurizing fluidic sample in a sample accommodation volume, i.e. reducing the pressure difference between the pressure in sample accommodation volume and the pressure before the sample separation unit. Additionally or alternatively, the sample separation apparatus and the method may however accomplish de-pressurizing of the sample accommodation volume, i.e. controlled and steady reducing the pressure in the sample accommodation volume after injection to bring the pressure level down to a pressure level suitable for refilling the sample accommodation volume. In different embodiments, the control unit and the fluid drive arrangement may be configured to fulfill one or both of the mentioned tasks (i.e. pre-pressurizing and de-pressurizing). Providing both tasks may be highly advantageous in certain applications of sample separation.

In the following, further embodiments of the sample separation apparatus and the method will be explained.

In an embodiment, a fluid drive unit being "partially pressure-decoupled" or experiencing a "partial pressure decoupling" may be at least one of the following:

- only one cylinder-piston unit of a fluid drive unit is pressure decoupled, while another cylinder-piston unit of the same fluid drive unit is not pressure decoupled
- pressure decoupling only in a limited pressure sub-range (e.g. when pressure in the decoupled cylinder-piston unit or fluid drive unit is lower than the system pressure)
- being only coupled via a significant restrictor, such that a pressure change in one member may only relatively slowly cause a pressure change in the other member, e.g. with the characteristic time in the range of 50 ms or more.

In an embodiment, pre-pressurizing comprises increasing a pressure in the sample accommodation volume towards a pressure before or upstream of the sample separation unit. In particular, pre-pressurizing the sample accommodation volume may bring fluidic sample accommodated therein up to system pressure, i.e. a pressure in the flow path before the sample separation unit.

In an embodiment, de-pressurizing comprises decreasing a pressure in the sample accommodation volume compared to a pressure before or upstream of the sample separation unit. In particular, it may be possible to decrease the pressure in the sample accommodation volume down to ambient pressure. The pressure reduction may reduce possible damage by cavitation on the switching valve or other parts establishing initial connection of a compressed volume to depressurized environment (which may be at ambient pressure).

In an embodiment, the fluid drive arrangement comprises a plurality of serially coupled and/or parallel coupled functionally cooperating fluid drive units for driving the mobile phase before injecting the fluidic sample from the sample accommodation volume in the flow path. For driving the mobile phase, at least two of the fluid drive units may be serially connected or may be coupled in parallel. The fluid drive units may for instance each be a piston pump comprising a piston reciprocating in a synchronized or coordinated manner within a piston chamber for driving the mobile phase. For pre-pressurizing the sample accommodation volume, one of these serially or parallel connected fluid drive units may be (for example temporarily) decoupled from the remaining one or ones, and can be used for bringing the sample accommodation volume to system pressure before injection of the fluidic sample into the flow path. For instance, two fluid drive units may be configured as two channels of a binary pump, each channel being a two-piston (e.g. serial) pumping unit.

In an embodiment, the fluid drive arrangement comprises a plurality of functionally cooperating fluid drive units coupled—individually or in groups—in parallel for driving the mobile phase before injecting the fluidic sample from the sample accommodation volume in the flow path. In such an embodiment, the multiple fluid drive units (each of which may be configured as a piston pump in which a piston reciprocates within a piston chamber for driving mobile phase) are arranged fluidically in parallel rather than serially. Also in this configuration, it is possible that one or more of the fluid drive units of such a fluid drive arrangement are temporarily fluidically detached or decoupled out of the flow path in terms of pressure and temporarily operate for pre-pressurizing the fluidic sample in the sample accommodation volume.

In an embodiment, pressure decoupling of at least part of at least one of the fluid drive units comprises pressure decoupling (for instance only) one cylinder-piston unit of the respective fluid drive unit from the flow path while another cylinder-piston unit of the said fluid drive unit remains pressure coupled to the flow path. Such an embodiment is shown for instance in FIG. 12 to FIG. 14. In such an embodiment, it is for instance possible that only one cylinder-piston unit is temporarily decoupled from another one so as to decompress the sample accommodation volume. During that time interval, the other cylinder-piston unit may continue to pump mobile phase along the flow path.

In an embodiment, the sample separation apparatus comprises a pressure coupling or decoupling unit (in particular a valve, more particularly a check valve or an active valve, e.g. a rotary valve) between the one cylinder-piston unit and the other cylinder-piston unit for selectively pressure coupling or pressure decoupling the one cylinder-piston unit with regard to the other cylinder-piston unit. In particular, the pressure coupling or decoupling unit may be controllable by the control unit. Such a valve may disable a pressure connection between the two cylinder-piston units for enabling simultaneous pre-compression and mobile phase supply. When establishing a pressure connection between the two cylinder-piston units, the valve may enable supply of mobile phase to the flow path by both cylinder-piston units.

In an embodiment, the sample separation apparatus is configured as a multidimensional sample separation apparatus, in particular as a two-dimensional sample separation apparatus, more particularly as a two-dimensional liquid chromatography sample separation apparatus. Particularly, two separation units may be provided in such a sample separation apparatus when being configured for a two-dimensional separation. This means that the sample is first separated in accordance with a first separation criterion, and at least one or some of the fractions resulting from the first separation are subsequently separated in accordance with a second, preferably different, separation criterion or more finely separated in accordance with the first separation criterion. The advantages in terms of pre-pressurizing a fluidic sample in a sample accommodation volume before initiating separation of the fluidic sample in a separation unit are particularly pronounced in a multidimensional sample separation apparatus in which the fluidic sample is first separated by a first sample separation dimension before further separating the already separated fluidic sample in a subsequent second sample separation dimension. Optionally, at least one further sample separation dimension may be added.

In an embodiment, the sample separation apparatus is configured as a process monitoring sample separation apparatus. Also for process monitoring purposes, the described pre-pressurizing of the loaded fluidic sample being temporarily stored in the sample accommodation volume before switching the fluidic sample into the flow path is highly advantageous. In such an application, it is for instance possible that a fluidic product under manufacture is coupled (for instance at low pressure) out of the process and is analysed by sample separation in the sample separation apparatus to monitor the main process. Also in such an application, it is advantageous that the branched off fluidic sample is brought to system pressure or close to system pressure before starting the actual sample separation.

In an embodiment, after the pressurizing, the control unit may control the sample accommodation apparatus for pressure coupling the previously pressure-decoupled at least one of the fluid drive units with the flow path. Thus, after fulfilling the task of pre-pressurizing the sample accommodation volume, the corresponding temporarily pressure-decoupled fluid drive unit may be switched back into the flow path to again fulfil the task of driving mobile phase to the sample separation unit.

In an embodiment, the fluid drive arrangement is configured for driving a plurality of different solvents—each of which being assigned to a respective one or to a respective group of the fluid drive units—to be mixed for forming the mobile phase. For instance, the fluid drive arrangement may be a gradient pump pumping a gradient solvent composition composed of multiple different solvents towards a sample separation unit (such as a chromatographic column). For instance, one of the solvents may be water and another one of the solvents may be an organic solvent such as methanol, ethanol or acetonitrile. By modifying the solvent composition over time, a chromatographic gradient run may be carried out which individually releases trapped or adsorbed fractions of a fluidic sample from a stationary phase of the separation unit. In a so-called isocratic separation mode, it is also possible that the fluid drive arrangement supplies a constant solvent composition to the sample separation unit. As long as a fluid drive unit is temporarily used for pre-pressurizing the sample accommodation volume, this fluid drive unit may be temporarily unable to provide an assigned solvent to the mobile phase. A resulting temporary modification of the solvent composition of the mobile phase can be compensated, prevented or suppressed by the below described concept of one or more buffer volumes.

In an embodiment, the at least one fluid drive unit being pressure-decoupled from the flow path is configured to bring the sample accommodation volume to a first pressure value corresponding to or being similar to a second pressure value in the flow path before switching the sample accommodation volume in the flow path. More generally, the temporarily pressure-decoupled fluid drive unit may bring the fluidic sample from its initial pressure towards system pressure of the flow path. The first pressure value may for instance be ambient pressure, whereas the second pressure value may be a system pressure of the flow path. For instance, ambient pressure may be around 1 bar. System pressure may be at least 500 bar, in particular at least 1000 bar, more particularly at least 1200 bar. These pressure values show that pre-pressurizing the sample accommodation volume is efficient for preventing pronounced pressure shocks which may occur when switching the fluidic sample in the sample accommodation volume to system pressure without pre-pressurizing.

In an embodiment, the control unit is configured for fluidically coupling the sample accommodation volume with the flow path after the pressurizing. Thus, after having brought the fluidic sample in the sample accommodation volume up to or close to system pressure by the temporarily pre-pressurizing pressure-decoupled at least one fluid drive unit of the fluid drive arrangement, the pre-pressurized fluidic sample may be injected into the flow path so as to be driven by the fluid drive arrangement together with the mobile phase towards a separation unit such as a chromatographic separation column. By taking this measure, the at least one temporarily pre-pressurized decoupled fluid drive unit may then be used again as part of the fluid drive arrangement for driving the mobile phase at high pressure towards the sample separation unit.

In an embodiment, the control unit is configured for temporarily fluidically decoupling the at least one pressure-decoupled fluid drive unit from at least one remaining of the fluid drive units. In particular, the control unit is adapted for operating the at least one remaining fluid drive unit for supplying mobile phase to the sample separation unit while the at least one decoupled fluid drive unit is decoupled from the flow path. Thus, while at least one of the fluid drive units temporarily serves for pre-pressurizing the sample accommodation volume, one or more remaining fluid drive units of the fluid drive arrangement (which previously cooperated for driving the mobile phase at high pressure) may be fluidically decoupled and pressure-decoupled from one another. By taking this measure, a part of the fluid drive arrangement may temporarily serve for pre-pressurizing the fluidic sample and the sample accommodation volume, while the remaining part can still be used for another purpose, for instance continuing to pump a mobile phase to a sample separation unit.

In an embodiment, the sample separation apparatus comprises at least one fluidic valve being switchable by the control unit to thereby selectively switch at least one of the fluid drive units to be pressure coupled with the flow path or to be pressure-decoupled from the flow path. Such valve may be configured as rotatable valve having a stator (which may have one or a plurality of fluid ports) and a rotor (which may have a plurality of grooves or other fluidic conduits for connecting respective ones of the fluid ports) being rotatable with regard to the stator to thereby establish a desired fluid communication state between fluid ports and fluid conduits. The stator and the rotor may be rotated relative to one another so that different fluidic configurations between the at least one fluid conduit and the at least one fluid port may be established. By simply switching such a fluidic valve, controlled by a control unit such as a processor, the different operation modes of the sample separation apparatus can be switched or toggled between the mode, in which the fluid drive arrangement may either serve for driving the mobile phase alone, or another mode in which the fluid drive arrangement may be at least partially used for pre-pressurizing fluidic sample in a sample accommodation volume before injection of the preloaded fluidic sample into the flow path.

In an embodiment, the sample separation apparatus comprises at least one sensor configured for sensing information indicative of a pressure of the sample accommodation volume when being pressure-decoupled from the flow path. By implementing a sensor for monitoring the pressure relevant information at or close to the sample accommodation volume, the pre-pressurizing task fulfilled by the at least one temporarily pressure-decoupled fluid drive unit can be monitored. By taking this measure, the pre-pressurizing operation may be rendered highly accurate. If desired, an adjustment of the pre-pressurizing process can be carried out when detection signals captured by the at least one pressure sensor indicate a deviation of the actual pre-pressurizing action compared to a target process.

In an embodiment, the control unit is configured for switching the fluid drive units into an operation mode in which each of the fluid drive units is fluidically coupled with the flow path and is configured for supplying a respective one of a plurality of solvents to be mixed at a mixing point to provide the mobile phase in the flow path. In particular, the sample accommodation volume may be fluidically decoupled from the flow path in this operation mode. Hence, the fluid drive units may also be operated in a way that one of them provides a first solvent and the other one provides a second solvent to a mixing point.

In an embodiment, the control unit is configured for switching the fluid drive units into an operation mode in which one of the fluid drive units drives a solvent (in particular to a mixing point and from there) towards another one of the fluid drive units, in particular simultaneously towards the sample separation unit and towards another one of the fluid drive units, wherein in particular the sample accommodation volume is fluidically decoupled from the flow path in this operation mode. Thus, in yet another operation mode, solvent may be transported from one fluid drive unit to another one of the fluid drive units, for example for generating a mixture of the solvents by this solvent transfer. For this purpose, a mixing point may be foreseen at which the respective solvent is not or not only transported towards the separation unit, but at least partially from one fluid drive unit to another one. By taking this measure, a desired solvent composition may be generated in the solvent receiving fluid drive unit prior to using the solvent delivering fluid drive unit for pre-pressurizing the sample accommodation volume after a switching operation.

In an embodiment, the control unit is configured for switching the fluid drive units in another operation mode in which the solvent which has been driven towards the other one of the fluid drive units is driven by said other fluid drive unit in opposite direction together with another solvent into the flow path. Thus, the solvent which has previously been re-directed from one of the fluid drive units to the other one can be pumped back towards the mixing point and from there to the flow path and finally into the sample separation unit. When being driven back by the other fluid drive unit, the solvent from the original fluid drive unit may be mixed with another solvent from said other fluid drive unit. The resulting solvent mixture in the conduits and in an assigned buffer volume may hence be capable of compensating a solvent composition distortion resulting from the described operation and deviating from a target solvent composition.

In an embodiment, the control unit is configured for switching the fluid drive units in an operation mode in which one of the fluid drive units drives a solvent as mobile phase along the flow path and into the sample separation unit, and another one of the fluid drive units pressurizes the sample accommodation volume fluidically decoupled from the flow path. Thus, while a part of the fluid drive units of the fluid drive arrangement fulfils the task of pre-pressurizing fluidic sample in the sample accommodation volume after being fluidically decoupled from at least one other of the fluid drive units, the latter mentioned at least one fluid drive unit may maintain a flow of mobile phase towards the sample separation unit. Thus, all fluid drive units of the fluid separation arrangement may be active during pre-pressurizing the sample accommodation volume.

In an embodiment, the sample separation apparatus comprises at least one buffer volume (wherein each thereof may be assigned to a respective one of the fluid drive units and) being configured for temporarily accommodating the mobile phase or one of its components (for instance solvents). In particular, it is possible to temporarily fill the at least one buffer volume with a solvent and to later supply this solvent from the at least one buffer volume to a mixing point, where the components of the mobile phase may be mixed, or otherwise to the mobile phase path. Thereby, it is possible to at least partially compensate the temporary decoupling of the at least one of the fluid drive units from the flow path and maintain the mobile phase flow with undisturbed composition or at least to reduce or minimize the composition disturbance (while pre-pressurizing the sample accommodation volume, the pressure-decoupled fluid drive unit is not able to deliver its solvent to the mobile phase supplied to the sample separation unit). By implementing one or more of such buffer volumes, it is possible to store portions of a solvent of a solvent composition temporarily to ensure a proper solvent composition delivery even when temporarily using part of or some of the fluid drive units of the fluid drive arrangement for pre-pressurizing fluidic sample in the sample accommodation volume prior to injection.

In an embodiment, the at least one buffer volume comprises a first buffer volume fluidically connectable between the fluid drive units and the sample accommodation volume, and a second buffer volume fluidically connectable between the sample accommodation volume and the sample separation unit. By taking this measure, the predescribed task of the buffer volumes may be fulfilled in a refined way, wherein different solvents may be temporarily accommodated in the respective buffer volumes.

In an embodiment, the control unit is configured for switching the fluid drive units in an operation mode in which the pressure-decoupled or fluidically decoupled fluid drive unit drives solvent into a first buffer volume and simultaneously pressurizes the sample accommodation volume, while another one of the fluid drive units drives another solvent into a second buffer volume and through the sample separation unit. Hence, the pre-pressurizing pressure-decoupled fluid drive unit(s) at the same time transports a corresponding solvent into the first buffer volume, while at the same time the remaining at least one fluid drive unit drives another solvent into the second buffer volume, whereas the proper solvent composition stored in the said second buffer volume is displaced in the direction of the sample separation unit thus maintaining undisturbed composition of the mobile phase flow despite decoupling at least one of the fluid drive units fluidically from the mobile phase delivery path. This allows for an efficient operation of the sample separation apparatus.

In an embodiment, the control unit is configured for switching the at least one buffer volume to be fluidically decoupled from the flow path. By temporarily switching at least one of the buffer volumes out of the flow path, it is possible to store in this buffer volume temporarily a respective solvent or solvent composition which can be used for ensuring a proper solvent composition at a later point of time. Thereby, any artefacts on the solvent composition by the temporarily pressure decoupling of at least one of the fluid drive units from the flow path may be eliminated or prevented. Alternatively, it is also possible that a deviant or undesired solvent or solvent composition is stored in a buffer volume and is disposed to waste at a suitable moment, e.g. later in time.

In an embodiment, the control unit is configured for switching the at least one buffer volume to temporarily accommodate a solvent capable of at least partially bridging a discrepancy between a composition of the mobile phase that might be delivered by the fluid drive units lacking the at least one fluidically decoupled fluid drive unit or part thereof, and a target composition of the mobile phase in conduits of the sample separation apparatus. In periods in which at least one of the fluid drive units is pressure-decoupled from the flow path for pre-pressurizing fluidic sample, the remaining at least one fluid drive unit may drive mobile phase through the sample separation apparatus with a solvent composition deviating from a target composition, since the solvent contribution from the pressure-decoupled at least one fluid drive unit is missing. In order to compensate this, a certain solvent or solvent mixture amount with target composition may be temporarily stored in the at least one buffer volume. This buffered certain solvent amount may be later added to (for instance spliced into) the flow of the mobile phase to at least partially compensate for the disturbed solvent composition or to eliminate the disturbance or to substitute for the disturbed portion.

In an embodiment, an injector of the sample separation apparatus comprises a needle and a seat configured for accommodating the needle, wherein the needle is drivable towards a sample container for intaking fluidic sample into the sample accommodation volume by the sample drive, and wherein the needle is configured to be drivable to the seat prior to injection. In such a configuration, the fluidic sample may be stored in the sample container (such as a vial). The needle may be driven out of the seat, for instance by a robot, and may be immersed into the fluidic sample in the sample container. Subsequently, a piston of a sample drive (such as a metering pump) may be driven in a direction out of the corresponding cylinder to thereby intake a certain amount of fluidic sample from the sample container via the needle into the fluid accommodation volume. Thereafter, the needle may be driven back into the seat to establish a fluid tight connection there. By switching the fluidic valve into an injection switching state after pre-pressurizing the fluidic sample by the temporarily pressure-decoupled fluid drive unit, the intaken fluidic sample may be injected from the sample accommodation volume towards the separation unit.

Embodiments of the above described fluidic valve may be implemented in conventionally available HPLC systems, such as the Agilent 1200 Series Rapid Resolution LC system or the Agilent 120 HPLC series (both provided by the applicant Agilent Technologies).

One embodiment of a sample separation apparatus, in which one or more of the above described fluidic valves may be implemented, comprises a pumping apparatus as fluid drive or mobile phase drive having a pump piston for reciprocation in a pump working chamber to compress liquid in the pump working chamber to a high pressure at which compressibility of the liquid becomes noticeable. This pumping apparatus may be configured to at least one of the group: accept or acquire (from operator's input, notification from another module of the instrument or similar); determine; measure; elsewise derive solvent properties; operate under consideration of representing or retrieving actual properties of fluidic content, which may be anticipated to be in a sampling apparatus.

The separation unit of the fluid separation apparatus preferably comprises a chromatographic column providing the stationary phase. The column may be a glass or steel tube (for instance with a diameter from 50 μm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually fine powders or gels and/or are microporous for an increased surface.

The mobile phase (or eluent) can be a pure solvent or a mixture of different solvents (such as water and an organic solvent such as ACN, acetonitrile). It can be chosen for instance to adjust the retention of the compounds of interest and/or to optimize the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the fluid drive arrangement and its fluid drive units, in the mobile phase may range from 2-200 MPa (20 to 2000 bar), in particular 10-150 MPa (20 to 1500 bar), and more particularly 50-120 MPa (500 to 1200 bar).

The sample separation apparatus, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 120 HPLC series, both provided by the applicant Agilent Technologies.

Embodiments of the invention can be partly or entirely embodied or supported by one or more suitable software programs or software, which can be stored on or otherwise provided by any kind of non-transitory medium or data carrier, and which might be executed in or by any suitable data processing unit such as an electronic processor-based computing device (or system controller, control unit, etc.) that includes one or more electronic processors and memories. Software programs or routines (e.g., computer-executable or machine-executable instructions or code) can be preferably applied in or by the control unit. For example, one embodiment of the present disclosure provides a non-transitory computer-readable medium that includes instructions stored thereon, such that when executed on a processor, the instructions perform the steps of the method of any of the embodiments disclosed herein.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

Figure 1:
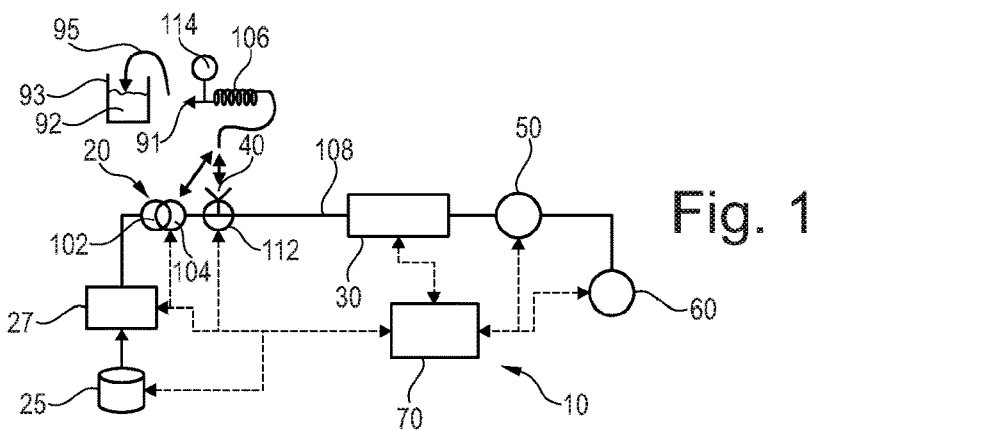
FIG. 1 shows a liquid sample separation apparatus in accordance with embodiments of the present invention, particularly used in high performance liquid chromatography (HPLC).

The illustration in the drawing is schematic.

DETAILED DESCRIPTION

Before describing the figures in further detail, some basic considerations of the present invention will be summarized based on which exemplary embodiments have been developed.

According to an exemplary embodiment of the invention, sample compression may be performed by a decoupled fluid drive unit (which may be a pump channel) of a fluid drive arrangement.

In HPLC and in particular in UHPLC, it is beneficial to avoid pressure fluctuations on the sample separation unit (in particular chromatographic column) inlet, because these may lead to accelerated column degradation. One of the major sources for such pressure fluctuations is the sample injection due to abrupt consumption of additional solvent volume (so-called compression volume of the sample), especially if the sample container has a significant volume or if the sample plug is accompanied by air portions, for example for hydrodynamic isolation.

Numerous approaches are known to avoid these pressure artifacts, such as providing the added volume in coordination with valve switching, feed injection of the sample, and sample pre-compression by a metering device of the sampler. Common for these approaches is that the fluidic sample is pressurized before it is fluidically connected to the flow path leading to the column. It is still possible to pressurize the sample in the column flow path without creating a pressure disturbance at the column head, but this requires a very sharp coordination of establishing a connection between the sample and the column flow path and accelerating the pump or providing the added volume by taking another measure.

Quantitatively, this requirement means that the time constant (flow resistance in the path towards the column times the elasticity of the sample container including compressibility of the contained sample) is greater than the uncertainty of the coordination of valve and pump operation in time and/or than lag time of pressure control loop (if any). This is not easy to implement (for example slowly connecting valve) due to technical limitations. Other mentioned approaches all require an additional pump for sample compression, which is available only in some system configurations (for example a metering pump of a sampler or a separate additional pump as in feed injection).

For instance, in a two-dimensional liquid chromatography (2D-LC) application there is no such pump available by default and the sample volumes can be considerable. A described approach in the 2D-LC, which overcomes this shortcoming is however not universal and bears its specific limitations.

In view of the foregoing, an exemplary embodiment of the invention overcomes the above-mentioned issues by pre-compressing a fluidic sample in a sample separation apparatus (such as an HPLC or a UHPLC system), wherein a (for instance binary) pump for driving mobile phase is used additionally for harmonizing the pressures in the parts of the system before connecting them fluidically. Specifically, a pump for driving the mobile phase or its parts can temporarily be used for pressurizing the sample in order to avoid pressure disturbances on the column head of the sample separation unit without requiring any additional pump. Exemplary embodiments of the invention are especially beneficial in, but not limited to, 2D-LC applications and process monitoring applications.

In an embodiment of the invention, the fluid drive arrangement (which may be a binary pump) may have two fluid drive units as independently operating channels. The task fulfilled by an exemplary embodiment of the invention is to maintain an undisturbed column flow, whereas a decoupled sample volume is pressurized prior to connecting it into or to the flow path. In particular, this task can be accomplished by temporarily, essentially or completely, decoupling of the both fluid drive units (in particular pump channels) of the fluid drive arrangement from one another, such that one fluid drive unit or channel maintains the column flow, while the other fluid drive unit pressurizes the sample accommodation volume (in particular a sample container).

After the fluidic sample is pressurized, the fluid drive units may be recombined (in particular by rejoining the channel flows). It may be advantageous to inhibit undiluted strong solvent from entering the fluidic path downstream of the mixing point of two solvents. For this, it is possible to temporarily reverse the flow direction of the strong solvent channel (e.g. simultaneously increasing the weak solvent flow to maintain the total system flow) and use the overfilled strong solvent channel for compression of the sample accommodation volume or sample loop. This may result in a plug of weak solvent to follow the sample towards the sample separation unit (in particular a chromatographic column), which is typically tolerable or even beneficial.

Preferably, a measure may be taken for maintaining the solvent composition free of disturbance, especially free of a varying disturbance which may result from decoupling and recoupling the flow paths of the fluid drive units (which may be pump channels).

These disturbances can occur due to delivery of pure solvents into the flow path when the fluid drive units or channels are decoupled. It may be difficult or impossible to recombine those volumes to the desired composition before they enter the sample separation unit. Such elimination of the composition disturbance can be achieved by exclusion of these pure solvent portions from the flow path before the analysis and either discarding them or bringing them into the flow path after the analysis before the regeneration phase or to other uncritical phase of an analysis cycle.

Still another embodiment may include delivery of the sample plug to and through the joining or mixing point of the two fluid drive units or channels by only one of the fluid drive units or channel pumps.

In different embodiments, different valve geometries are possible in order to achieve the described operation (compare FIG. 6, FIG. 9, FIG. 11, FIG. 13 and FIG. 14). Also, one or more fluidic valves already present in the system (such as a purge valve of a binary pump and/or a modulation or injection valve of the sample loop or sample accommodation system) can be used, adapted or modified to partly or completely implement the described switching algorithm.

According to an exemplary embodiment of the invention, a sample separation apparatus is provided in which a fluid drive arrangement (for instance implemented as a binary pump with two solvent channels) may be temporarily used in a way that one of the solvent channels is deactivated and the corresponding fluid drive unit is used for pre-compressing fluidic sample loaded in the sample accommodation volume. While small deviations of the solvent composition may occur during this temporary pre-compression time interval, the remaining fluid drive unit(s) may maintain the transport of solvent towards the sample separation unit. In a further embodiment, it is possible to compensate at least partially for resulting small deviations of the solvent composition by coupling part of the solvent portions from both pumps and correct the slightly deviating solvent composition.

In a preferred embodiment, at least two fluid drive units (such as pumps like piston pumps) for driving solvent may be temporarily pressure-separated from one another, so that—during maintaining the pressure separation—at least one of these fluid drive units pre-compresses a fluidic sample in a sample accommodation volume, while at the same time the at least one remaining fluid drive unit continues to drive solvent in the flow path towards a sample separation unit. In one operation mode of such a sample separation apparatus, at least one of the fluid drive units of the fluid drive arrangement for driving mobile phase can then be pressure-decoupled out of the flow path and can serve, in this operation mode, for pre-compressing the fluidic sample in the sample accommodation volume up to the system pressure. For example, the fluid drive units may be fluid drive units which may provide mobile phase via a mixing point into a main path or flow path.

In one specific embodiment, the fluid drive arrangement may be a binary pump from which one fluid drive unit temporarily serves for providing solvent and can be temporarily decoupled from the other fluid drive unit for pre-pressurizing fluidic sample.

In another embodiment, two serial fluid drive units (such as two serial piston pumps) cooperating or being synchronized for providing a solvent composition may be used in an operation mode in which one of the fluid drive units, being presently not needed for the task of solvent supply, can be switched in fluidic communication with a sample accommodation volume for pre-compression. Thus, a temporarily inactive or not required one of these serial fluid drive units can be used temporarily for pre-pressurizing fluidic sample.

Exemplary embodiments can be used particularly advantageous for two-dimensional liquid chromatography or process monitoring, since in instruments used for these purposes no metering pump may be present which can be otherwise used for pre-pressurizing the sample accommodation volume.

In yet another exemplary embodiment, the described procedure can be implemented in a process analysis sample separation apparatus in which no autosampler is required.

Referring now in greater detail to the drawings, FIG. 1 depicts a general schematic of a liquid separation system as example for a sample separation apparatus 10 according to an exemplary embodiment of the invention. A pump as fluid drive arrangement 20 receives a mobile phase from a solvent supply 25, typically via a degasser 27, which degases and thus reduces the amount of dissolved gases in the mobile phase. The mobile phase drive or fluid drive arrangement 20 drives the mobile phase through a sample separation unit 30 (such as a chromatographic column) comprising a stationary phase. A sampler or injector 40, comprising a fluidic valve 112, can be provided between the fluid drive arrangement 20 and the separation unit 30 in order to subject or add (often referred to as sample introduction) a sample fluid into the mobile phase. The stationary phase of the separation unit 30 is configured for separating compounds of the sample liquid. A detector 50 is provided for detecting separated compounds of the sample fluid. A fractionating unit 60 can be provided for outputting separated compounds of sample fluid.

While the mobile phase can comprise one solvent only, it may also be mixed from plural solvents. The corresponding mixing process might be a low pressure mixing and provided upstream of the fluid drive arrangement 20, so that the fluid drive arrangement 20 already receives and pumps the mixed solvents as the mobile phase. Alternatively, the fluid drive arrangement 20 may comprise plural individual pumping units or fluid drive units 102, 104, with plural of the pumping units each receiving and pumping a different solvent or mixture, so that the mixing of the mobile phase (as received by the separation unit 30) occurs at high pressure side and downstream of the fluid drive arrangement 20 (or as part thereof). The composition (mixture) of the mobile phase may be kept constant over time, the so called isocratic mode, or varied over time, the so called gradient mode.

A data processing unit or control unit 70 (which can be a PC or workstation, alternatively it can be also a dedicated controller as a hand-held controller, or a processing unit such as microcontroller, microprocessor or plurality of those operating in coordinated manner or at least interacting, contained in or being part of one or more of the system modules 25, 27, 20, 30, 50, 60) may be coupled (as indicated by the dotted arrows) to one or more of the devices in the sample separation apparatus 10 in order to receive information and/or control operation. For example, the control unit 70 may control operation of the fluid drive arrangement 20 (for example setting control parameters) and receive therefrom information regarding the actual working conditions (such as output pressure, etc. at an outlet of the pump 20). The control unit 70 may also control operation of the solvent supply 25 (for example setting the solvent/s or solvent mixture to be supplied) and/or the degasser 27 (for example setting control parameters such as vacuum level) and might receive therefrom information regarding the actual working conditions (such as solvent composition supplied over time, vacuum level, etc.). The control unit 70 might further control operation of the sampling unit or injector 40 (for example controlling sample injection or synchronization of sample injection with operating conditions of the fluid drive arrangement 20). The separation unit 30 might also be controlled by the control unit 70 (for example selecting a specific flow path or column, setting operation temperature, etc.), and send—in return—information (for example operating conditions) to the control unit 70. Accordingly, the detector 50 might be controlled by the control unit 70 (for example with respect to spectral or wavelength settings, setting time constants, start/stop data acquisition), and send information (for example about the detected sample compounds) to the control unit 70. The control unit 70 might also control operation of the fractionating unit 60 (for example in conjunction with data received from the detector 50), which provides data back.

As already mentioned, the sample separation apparatus 10 for separating the fluidic sample according to FIG. 1 comprises the fluid drive arrangement 20, for instance embodied as a binary pump, comprising two fluid drive units 102, 104 (each configured as high-pressure pump) for driving a mobile phase along a flow path 108 to sample separation unit 30, which is embodied as chromatographic separation column. A sample accommodation volume 106 is here embodied as a sample loop and is configured for temporarily accommodating the fluidic sample before injection. The sample accommodation volume 106 is hence configured to be selectively fluidically coupleable with the flow path 108 (for sample injection) or fluidically decoupleable from the flow path 108 (for sample intake). The sample accommodation volume 106 may also be denoted as sample introduction unit, and may for instance be a sample loop, an injection valve, an autosampler, etc. The sample accommodation volume 106 is responsible for filling the fluidic sample into the flow path 108 or its part between the shown two terminals of the sample accommodation volume 106.

The control unit 70, which may be a processor and which may be configured for controlling the entire operation of the sample separation apparatus 10, may be configured for pressure decoupling a respective one of the fluid drive units 102, 104 from the flow path 108 in one operation mode of the sample separation apparatus 10 to enable the at least one pressure-decoupled fluid drive unit 102, 104 to pressurize the sample accommodation volume 106 before fluidically coupling the sample accommodation volume 106 with the flow path 108. The fluid drive units 102, 104 of the fluid drive arrangement 20 are two functionally cooperating fluid pumps driving the mobile phase before injecting the fluidic sample from the sample accommodation volume 106 in the flow path 108.

A respective one of the fluid drive units 102, 104 being presently pressure-decoupled from the flow path 108, may be configured to bring the sample accommodation volume 106 from ambient pressure up to system pressure in the flow path 108 (for instance 1200 bar) before switching or otherwise connecting the sample accommodation volume 106 into or to the flow path 108. The control unit 70 can control the fluidically coupling of the sample accommodation volume 106 with the flow path 108 after the pressurizing by correspondingly switching fluidic valve 112. Moreover, the control unit 70 is adapted for operating the respective remaining (i.e. the not pressure-decoupled or pressure separated) fluid drive unit 102, 104 for continuously supplying mobile phase to the sample separation unit 30 while the presently decoupled fluid drive unit 102, 104 is decoupled from the flow path 108. Furthermore, the fluidic paths of the instrument are switchable by the control unit 70 by a (not shown) fluidic valve or another switching appliance to selectively switch a respective one of the fluid drive units 102, 104 to be fluidically coupled or pressure coupled with the flow path 108 or to be pressure-decoupled from the flow path 108. Beyond this, the sample separation apparatus 10 may comprise a pressure sensor 114 configured for sensing information indicative of a pressure of the sample accommodation volume 106 when being pressure-decoupled from the flow path 108. The pressure sensor 114 may supply the result of the pressure detection to the control unit 70 for a refined control of the sample separation apparatus 10.

FIG. 1 also shows schematically how the sample accommodation volume 106 can be filled with a fluidic sample. For instance, a needle 91 may be temporarily driven out of a needle seat (not shown in FIG. 1) of the injector 40 and may be temporarily immersed (see reference numeral 95) into a fluidic sample liquid 92 in a vial or other fluid container 93. An aliquot of the fluidic sample liquid 92 may then be drawn into the sample accommodation volume 106 via the needle 91. The fluidic sample in the sample accommodation volume 106 is then at or close to ambient pressure. If the fluidic sample at ambient pressure would be switched as such into the high pressure flow path 108 between the fluid drive arrangement 20 and the separation unit 30 being at a system pressure of for instance 1000 bar, the components of the fluidic path of the sample separation apparatus 10 of FIG. 1 would be subject of an abrupt pressure change (pressure shock) which might damage these components or at least reduce their lifetime. In order to prevent such an undesired effect, it is possible according to an exemplary embodiment to temporarily decouple one of the fluid drive units 102, 104 out of the flow path 108 and to fluidically disconnect the fluid drive units 102, 104 from one another so that a pressure-decoupled fluid drive unit (for instance 104) can be temporarily used to bring the fluidic sample in the sample accommodation volume 106 from ambient pressure to system pressure of 1000 bar. During this pre-pressurizing or pre-compression process, the other fluid drive unit (for instance 102) may continue to drive mobile phase along the flow path 108 towards the sample separation unit 30 at or close to system pressure of 1000 bar. After having brought the sample accommodation volume 106 to system pressure by the corresponding fluid drive unit 104, both the fluid drive unit 104 and the pre-compressed sample accommodation volume 106 may be re-coupled into the flow path 108 for injecting the pre-loaded and pre-pressurized fluidic sample in the sample accommodation volume 106 into the flow path 108 for separation in the sample separation unit 30. After having switched the sample accommodation volume 106 into or to the flow path 108, also the previously pressure-decoupled fluid drive unit 104 may contribute, in cooperation with the other fluid drive unit 102, to drive a solvent composition as mobile phase to the sample separation unit 30.

In a corresponding manner, the control unit 70 may be configured for pressure decoupling at least one of the fluid drive units 102, 104 from the flow path 108 in one operation mode of the sample separation apparatus 10, and may be configured for enabling the at least one pressure-decoupled fluid drive unit 102, 104 to de-pressurize the sample accommodation volume 106 after fluidically coupling the sample accommodation volume 106 with the flow path 108 for preparing a subsequent intake of fluidic sample in the sample accommodation volume 106. More specifically, a temporarily pressure decoupled fluid drive unit 102, 104 may be fluidically coupled with the sample accommodation volume 106 after the intaken fluidic sample from the sample accommodation volume 106 has been injected into the flow path 108. In this state, the sample accommodation volume 106 may already be fluidically decoupled from the flow path 108, but may still be at a pressure level significantly above ambient pressure. For preventing pressure shocks when driving the needle 91 out of the seat (not shown in FIG. 1) for intaking new fluidic sample from the fluid container 93, the temporarily pressure decoupled one of fluid drive units 102, 104 may be operated for reducing the pressure of the sample accommodation volume 106, for instance for reducing this pressure down to ambient pressure. After having fulfilled this task, the temporarily pressure decoupled one of the fluid drive units 102, 104 may be coupled back with the flow path for driving mobile phase.

Thus, one exemplary embodiment may use at least one pressure decoupled fluid drive unit 102, 104 for pre-pressurizing fluidic sample in sample accommodation volume 106 prior to injection in the flow path 108. Another exemplary embodiment may use at least one pressure decoupled fluid drive unit 102, 104 for depressurizing the sample accommodation volume 106 after injection of fluidic sample in the flow path 108 and prior to intaking new fluidic sample in the sample accommodation volume 106. Yet another exemplary embodiment may use at least one pressure decoupled fluid drive unit 102, 104 for both tasks, i.e. for pre-pressurizing and for de-pressurizing.

Figure 2:
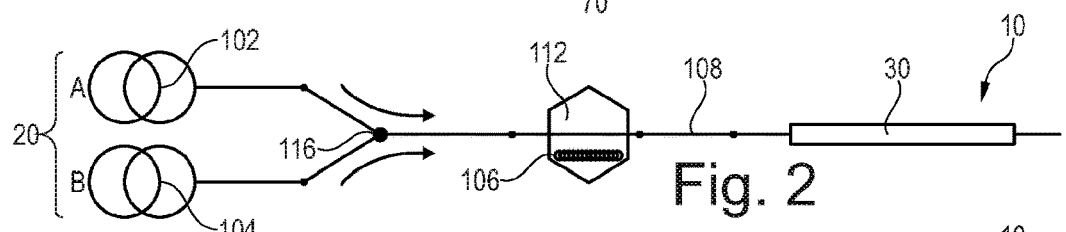
FIG. 2 illustrates part of a sample separation apparatus in an operation mode according to an exemplary embodiment of the invention in which different fluid drive units drive different solvents which are combined to a mobile phase delivered to a sample separation unit.
Figure 3:
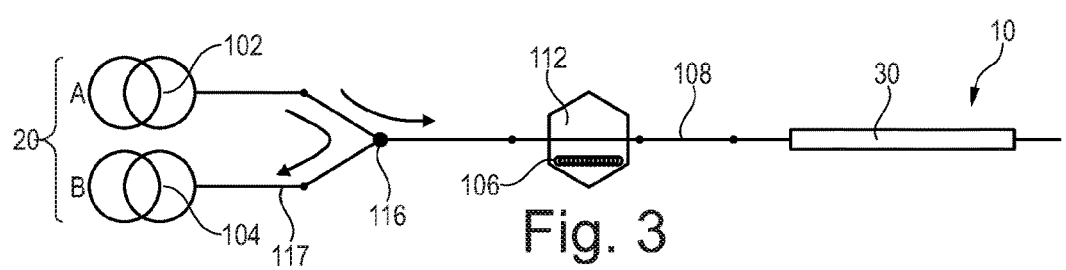
FIG. 3 illustrates part of the sample separation apparatus of FIG. 2 in an operation mode according to an exemplary embodiment of the invention in which one of the fluid drive units drives solvent partially to another fluid drive unit and partially to the sample separation unit.
Figure 4:
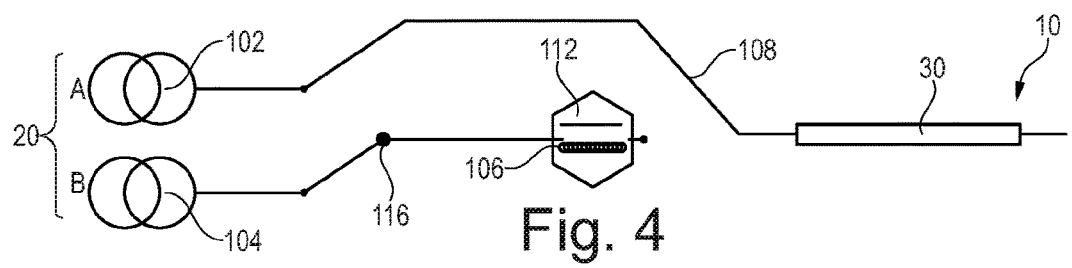
FIG. 4 illustrates part of the sample separation apparatus of FIG. 2 in an operation mode according to an exemplary embodiment of the invention in which one of the fluid drive units drives solvent to the sample separation unit and another fluid drive unit is pressure-decoupled from the former fluid drive unit and can be used for pressurizing the sample.

FIG. 2 to FIG. 4 illustrate part of a sample separation apparatus 10 in different operation phases according to an exemplary embodiment of the invention.

Figure 2A:
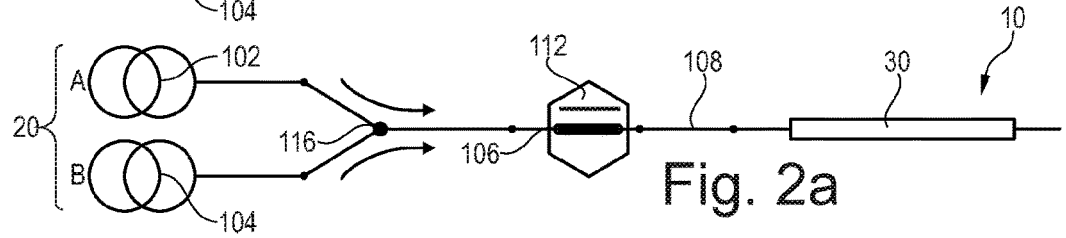
FIG. 2a illustrates the sample separation apparatus of FIG. 2 in another operation mode.

FIG. 2 schematically illustrates the sample separation apparatus 10 in an operation mode in which different fluid drive units 102, 104 drive different solvents A, B which are combined to a mobile phase delivered to sample separation unit 30. According to FIG. 2, the control unit 70 is configured for switching the fluid drive units 102, 104 into an operation mode in which each of the fluid drive units 102, 104 is fluidically coupled with the flow path 108 and is configured for supplying a respective one of a plurality of solvents A, B to be mixed at a mixing point 116 with the respectively other solvent(s) B, A to provide the mobile phase in the flow path 108. The sample accommodation volume 106 comprised in the sample introduction unit or injector 40 and being controlled e.g. by the fluidic valve 112 can be fluidically decoupled from the flow path 108 in this operation mode. Alternatively, the sample accommodation volume 106 can be fluidically coupled to or included in or into the flow path 108 in this operation mode as shown in the FIG. 2a, in which case the transport of the sample, that may be contained in the sample accommodation volume 106, to or towards the sample separation unit 30 may take place. Referring to FIG. 2, the fluid drive arrangement 20 is configured for driving the different solvents A, B, each of which being assigned to a respective one of the fluid drive units 102, 104, to be mixed for forming the mobile phase. In the shown embodiment, the fluid drive arrangement 20 comprises the two functionally cooperating fluid drive units 102, 104 coupled in parallel for driving the mobile phase before or after injecting a fluidic sample from the sample accommodation volume 106 in the flow path 108.

FIG. 2 shows an operation mode (which may be denoted as analysis mode) of the sample separation apparatus 10 in which a first solvent A is driven by first fluid drive unit 102 towards mixing point 116, while simultaneously second fluid drive unit 104 drives a second solvent B to the mixing point 116. The mixed solvents A and B corresponding to two different pump channels are then guided via a fluidic valve 112 to the flow path 108 and from there to the sample separation unit 30. The fluid drive units 102 and 104 are in pressure communication with one another and together provide the solvent composition or mobile phase at system pressure of for example 1000 bar. For example, solvent A can be a weak solvent such as water, whereas solvent B can be a stronger solvent such as ethanol. In this context, the terms "weak" and "strong" relate to an elution force of the respective solvent A or B in terms of releasing a fluidic sample from sample separation unit 30. Both fluid drive units 102, 104 are here embodied as piston pumps.

FIG. 3 illustrates part of the sample separation apparatus 10 of FIG. 2 in an operation mode according to an exemplary embodiment of the invention in which one fluid drive unit 102 drives solvent partially to another fluid drive unit 104 and partially to the sample separation unit 30, as indicated by two arrows. Hence, the control unit 70 is configured for switching the fluid drive units 102, 104 in an operation mode in which fluid drive unit 102 drives solvent A to mixing point 116 and from there simultaneously towards the sample separation unit 30 and towards the other fluid drive unit 104. It is thus possible to pre-store a certain amount of solvent A in the channel corresponding to solvent B (the prestored amount can be larger than the sample compression volume, for example can be in the range between 10 µl and 50 µl). Hence, the sample separation apparatus 10 can be switched so that solvent A is pumped from fluid drive unit 102 via mixing point 116 partially to the fluid drive unit 104. Therefore, solvent in line 117 between the fluid drive unit 104 and the mixing point 116 can be partially filled by solvent A and partially by solvent B. At the same time, a part of the solvent A is pumped from fluid drive unit 102 via mixing point 116 to the flow path 108 and from there to the sample separation unit 30.

FIG. 4 illustrates part of the sample separation apparatus 10 of FIG. 2 in an operation mode according to an exemplary embodiment of the invention in which fluid drive unit 102 drives solvent A to the sample separation unit 30 and the other fluid drive unit 104 is pressure-decoupled or pressure separated from the fluid drive unit 102. Thus, two different fluidic paths are established. A first fluidic path is from fluid drive unit 102 to flow path 108 and from there into separation unit 30. The fluid drive unit 104 comprised in the second fluidic path is now pressure-separated from the fluid drive unit 102 and from the flow path 108 and is connected to the fluidic valve 112, which operates the sample accommodation volume 106.

Starting from the configuration of FIG. 4, fluidic sample, which may be already present in the sample accommodation volume 106, may be compressed by the fluid drive unit 104 corresponding to the channel relating to solvent B, wherein the prestored solvent A (see FIG. 3) in the channel relating to solvent B prevents undiluted solvent B from entering the path downstream of mixing point 116. For such operation, the fluidic valve 112 may be switched into a position, such that the sample accommodation volume 106 is connected to the fluid drive unit 104 via corresponding fluidic channels, whereas the other end of the sample accommodation volume 106 may be blocked, thus enabling pressurization process when pushing additional solvent by the fluid drive unit 104 in or towards the other end of the sample accommodation volume 106. Thus, the control unit 70 is configured for switching the fluid drive units 102, 104, the fluidic valve 112 and the flow paths within the instrument by e.g. a switching valve 192 as shown in an embodiment described in more detail below referring to FIG. 5 to FIG. 11.

Referring in this respect also to FIG. 2 to FIG. 4, although the switching elements (such as switching valve 192) are not shown for sake of simplifying these figures, the path can be altered corresponding to the different operation modes, and this path switching may be accomplished by a not-shown path switching appliance. An example of such a switching appliance is shown in FIG. 6, FIG. 9, and FIG. 11 in more detail and indicated with reference numeral 112. Reference numeral 112 indicates a fluidic valve, which controls the sample accommodation volume 106. For example, fluidic valve 112 can be an autosampler valve or a modulator valve or a buffer valve (which may, descriptively speaking, also be denoted as parkdeck valve) for temporarily buffering or storing an amount of fluid (for instance a portion of a fluidic sample) as used for instance in 2D-LC or process monitoring. Fluidic valve 112 is represented in the figures as a hexagon. The round valve, referenced as 192 and shown in one of its possible embodiments in FIG. 6, FIG. 9, and FIG. 11 is also present or represented by its switching function in FIG. 7, FIG. 8, and FIG. 10 as well as in FIG. 1 to FIG. 5, although not being shown there.

The mentioned switching operation may bring the sample separation apparatus 10 in an operation mode in which one fluid drive unit 102 drives a solvent A as mobile phase along the flow path 108 and into the sample separation unit 30, and the other fluid drive unit 104 pre-pressurizes the sample accommodation volume 106 being presently fluidically decoupled from the flow path 108. Specifically, the sample contained in the sample accommodation volume 106 may be compressed by pushing the pre-stored weak solvent A into or at least towards the sample accommodation volume 106. By taking this measure, the fluidic sample and the sample accommodation volume 106 may be pre-compressed or pressurized, for example from ambient pressure up to system pressure (of for example 1000 bar). Fluid drive unit 104 is now temporarily used for bringing the fluidic sample to high pressure. Advantageously, no additional pump is necessary for pre-compressing the fluidic sample in the sample accommodation volume 106, since fluid drive unit 104 is temporarily used for this purpose. By switching from the operation mode according to FIG. 4 (after having pre-pressurized or pre-compressed the fluidic sample in the sample accommodation volume 116) to the operation mode of FIG. 2a, the fluidic sample is introduced in the flow path 108 and may be separated by the sample separation unit 30. The fluid drive units 102, 104 are now again pressure coupled. Afterwards, the fluidic valve 112 may be switched into the position corresponding to FIG. 2.

FIG. 5, FIG. 7, FIG. 8 and FIG. 10 illustrate part of a sample separation apparatus 10 according to another exemplary embodiment of the invention in different operation modes implementing buffer volumes 118, 120 (having respective volumes Va, Vb) for isolating of the solvent portions displaced during the compression phase. FIG. 6, FIG. 9 and FIG. 11 illustrate a possible embodiment using specific fluidic valve configurations corresponding to three of these operation modes.

Figure 5:
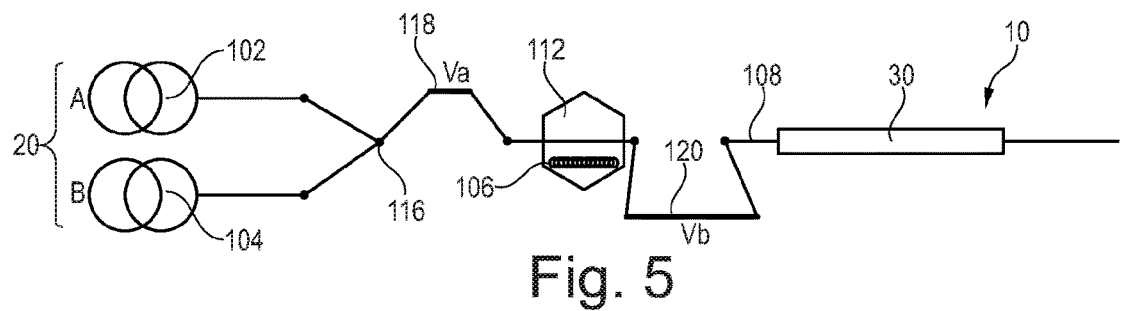
FIG. 5 illustrates part of a sample separation apparatus in an operation mode according to another exemplary embodiment of the invention in which different fluid drive units drive different solvents which are combined to a mobile phase delivered, via two buffer volumes, to a sample separation unit.
Figure 6:
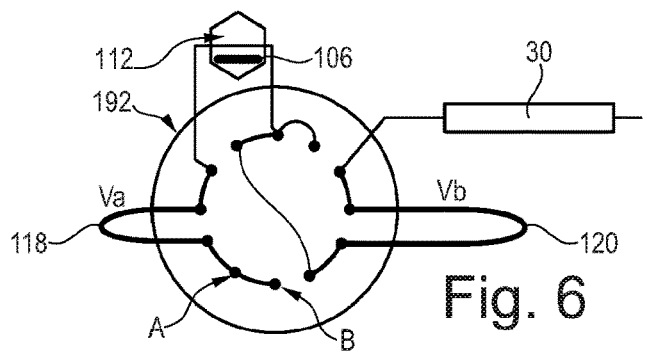
FIG. 6 illustrates a possible embodiment of a rotary fluidic valve of the sample separation apparatus in the operation mode according to FIG. 5.

FIG. 5 illustrates the sample separation apparatus 10 in an operation mode in which different fluid drive units 102, 104 drive different solvents A, B which are combined at mixing point 116 to a mobile phase delivered, via two buffer volumes 118, 120, to sample separation unit 30. Thus, the sample separation apparatus 10 of the present embodiment comprises the two buffer volumes 118, 120 each being configured for temporarily accommodating solvent (of a respective volume Va, Vb) of the mobile phase. First buffer volume 118 is located between the fluid drive units 102, 104 and the sample accommodation volume 106. Second buffer volume 120 is located between the sample accommodation volume 106 and the sample separation unit 30. According to FIG. 5, fluid drive unit 102 provides solvent A and fluid drive unit 104 provides solvent B to mixing point 116 and from there via first buffer volume 118 and fluidic valve 112 as well as via second buffer volume 120 to the flow path 108 and finally to the separation unit 30. Both buffer volumes 118, 120 may thereby get filled with a target solvent composition A+B.

Referring to FIG. 5, a regeneration phase is shown. Buffer volumes 118, 120 designated as Va and Vb are being filled with a desired solvent composition, which may be an initial analysis composition, and the sample separation unit 30 may be regenerated. The sample accommodation volume 106 may be either in a regeneration mode (for instance can be flushed) or in a sample receiving mode (for instance can be filled with fluidic sample).

FIG. 6 illustrates in detail fluidic valve 192 of the sample separation apparatus 10 in the operation mode according to FIG. 5. Thus, FIG. 6 shows a detail of the fluidic valve 192 and its connection to the various fluidic components described above, according to the configuration of FIG. 5.

Figure 7:
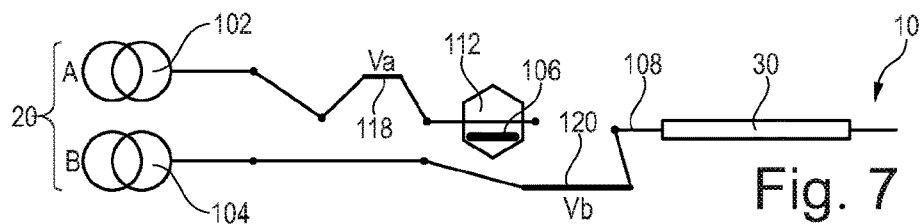
FIG. 7 illustrates part of the sample separation apparatus of FIG. 5 in an operation mode in which one of the fluid drive units drives solvent to the sample separation unit and another fluid drive unit is pressure-decoupled from the former fluid drive unit.

FIG. 7 illustrates part of the sample separation apparatus 10 of FIG. 5 in an operation mode in which one fluid drive unit 104 drives solvent to the sample separation unit 30 and another fluid drive unit 102 is pressure-decoupled from the former fluid drive unit 104.

In the shown embodiment, the control unit 70 is configured for switching the fluid drive units 102, 104 and the fluidic valve 192 into or to an operation mode in which the pressure-decoupled fluid drive unit 102 may drive solvent A into the first buffer volume 118 while another fluid drive unit 104 drives another solvent B into the second buffer volume 120, displacing thereby the desired solvent composition, e.g. an initial analysis composition from the buffer volume 120 into and through the sample separation unit 30. Referring to FIG. 7 (and FIG. 8), a sample compression phase is shown.

The sample may be introduced into the sample accommodation volume 106, if not already occurred. The channel relating to solvent A idles, while the channel relating to solvent B delivers system flow displacing Vb. It should be mentioned that the operation mode of FIG. 7 (and FIG. 8) is a transition mode which is activated only for a short period of time for the duration of sample compression procedure, which should be accomplished before the buffer volumes 118, 120 get filled with the respective solvent A or B only. In other words, it may be desirable that no pure solvents A, B get to the outlet (as seen in respect to the flow direction) of the corresponding buffer volume 118, 120.

Figure 8:
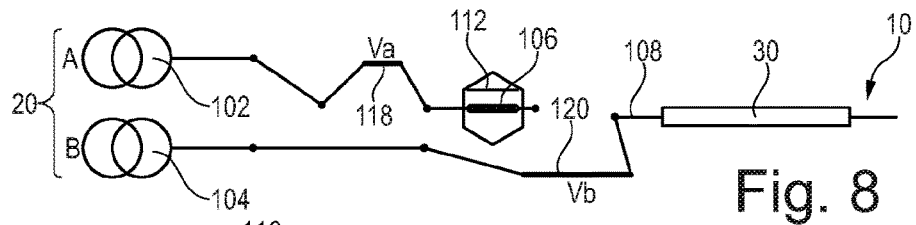
FIG. 8 illustrates part of the sample separation apparatus of FIG. 5 in an operation mode in which one of the fluid drive units drives solvent to the sample separation unit and another fluid drive unit being pressure-decoupled from the former fluid drive unit pre-pressurizes a sample accommodation volume.
Figure 9:
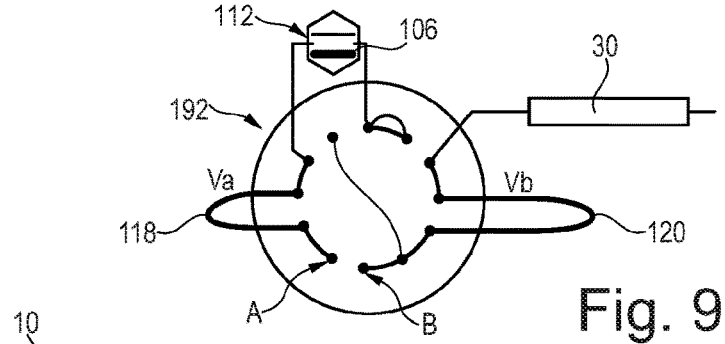
FIG. 9 illustrates the fluidic valve of FIG. 6 in the operation mode according to FIG. 7 and FIG. 8.

After the operation mode of FIG. 7, the sample separation apparatus 10, more specifically its fluidic valve 112, is switched into the configuration of FIG. 8.

FIG. 8 illustrates part of the sample separation apparatus 10 of FIG. 5 in an operation mode in which one of the fluid drive units 104 continues to drive solvent B to the sample separation unit 30, and the other fluid drive unit 102 being pressure-decoupled from the former fluid drive unit 104 now pre-pressurizes sample accommodation volume 106.

Referring to FIG. 8, sample compression is actually carried out. The channel corresponding to solvent A pressurizes the fluidic sample, while the channel corresponding to solvent B continues to deliver system flow displacing Vb. In the configuration of FIG. 8, the fluid drive unit 102 being pressure-decoupled from the fluid drive unit 104 and from the flow path 108 is operated to bring the fluidic sample in the sample accommodation volume 106 from ambient pressure to system pressure (for example 1000 bar). At the same time, solvent B is pumped into the second buffer volume 120, further displacing thereby the desired solvent composition, e.g. an initial analysis composition from the buffer volume 120 into and through the sample separation unit 30. In other words, the sample accommodation volume 106 is switched in the fluidic path served by fluid drive unit 102. The fluid drive unit 102 pumps solvent A into the first buffer volume 118, further displacing thereby the pre-stored desired solvent composition, e.g. an initial analysis composition from the buffer volume 118 into the sample accommodation volume 106 or fluidic channels connected to it, thus pressurizing the sample in the accommodation volume 106. At the same time, the preloaded desired solvent composition which has previously been stored in buffer volume 120 is pumped through separation unit 30 by fluid drive unit 104.

FIG. 9 illustrates the fluidic valve 192 of FIG. 6 in the operation mode according to FIG. 7, 8.

Figure 10:
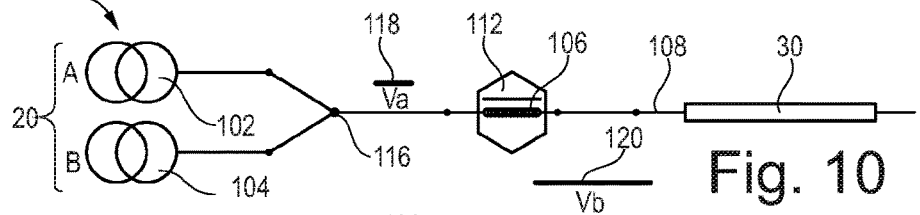
FIG. 10 illustrates part of the sample separation apparatus of FIG. 5 in an operation mode in which both fluid drive units drive solvent to the sample separation unit via the sample accommodation volume to thereby inject the pre-pressurized fluidic sample into the main flow path and to the sample separation unit.
Figure 11:
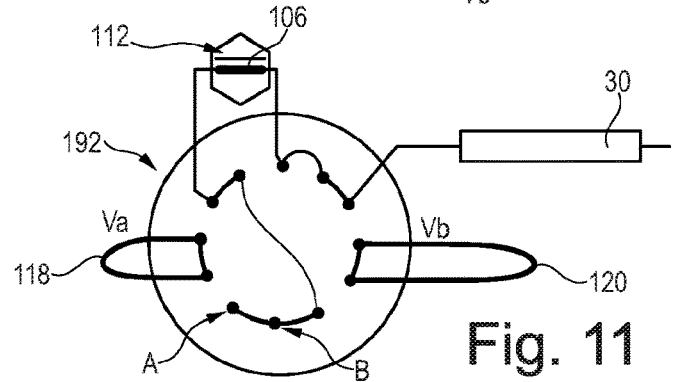
FIG. 11 illustrates the fluidic valve of FIG. 6 in the operation mode according to FIG. 10.

FIG. 10 illustrates part of the sample separation apparatus 10 of FIG. 5 in an operation mode in which both fluid drive units 102, 104 drive solvent A, B to the sample separation unit 30 via the sample accommodation volume 106 to thereby inject the pre-pressurized fluidic sample into the main flow path 108 and to the sample separation unit 30. At the same time, the control unit 70 has switched the valve 192 such as to exclude buffer volumes 118, 120 out of the flow path 108, so that the buffer volumes 118, 120 are now fluidically isolated and their content at least partly now comprising pure solvents A and B is not delivered to the column prior to the analysis.

In the shown analysis mode, the fluid drive arrangement 20, as high pressure pump, delivers a programmed composition at a programmed system flow rate through the sample separation volume 106 and the separation unit 30. The buffer volumes 118, 120 (now containing variable portions of pure solvent A and pure solvent B) are switched out of the flow path 108 and may be regenerated in the next regeneration phase.

Referring to FIG. 10, the sample separation apparatus 10 is switched into the shown operation mode, by again switching fluidic valve 192 under control of the control unit 70. As can be taken from FIG. 10, the fluid drive units 102, 104 are now again in fluid communication with one another and are at the same pressure value. Both fluid drive units 102, 104 pump their respective solvent A, B towards mixing point 116 and from there through sample accommodation volume 106, into flow path 108 and into sample separation unit 30. The actual separation of the fluidic sample which can now be or has already been injected into the flow path 108 can now be carried out (for instance in accordance with a gradient mode or an isocratic mode, according to which the solvent composition of the mobile phase can be adjusted correspondingly by fluid drive units 102, 104).

In the operation mode of FIG. 10, the buffer volumes 118, 120 are fluidically isolated, i.e. their content with solvent is not changed. Alternatively, it is possible that the buffer volumes 118, 120 are rinsed or cleaned or emptied during this time interval. After that, the system may be switched back into the initial configuration in which the buffer volumes 118, 120 can be filled again with a respective target composition of the mobile phase. If the buffer volumes 118, 120 are not rinsed or initialized in the phase represented in the FIG. 10, it is still possible to suppress errors in solvent composition. For that the system can be switched over into the initial configuration as shown in the FIG. 5 and FIG. 6, such that the content of the buffers 118,120 can flow through the sample separation unit 30 however, preferably only after completion of the separation of the fluidic sample or at least to a time, when a composition disturbance will not influence the analysis.

FIG. 11 illustrates the fluidic valve 192 of FIG. 6 in the operation mode according to FIG. 10.

Figure 12:
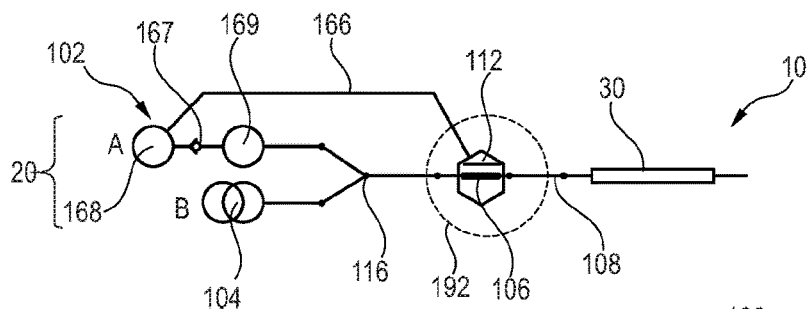
FIG. 12 illustrates part of a sample separation apparatus according to another exemplary embodiment of the invention in which two cylinder-piston units of a fluid drive unit may be separated or connected by a check valve so that one of the cylinder-piston units is selectively usable for pre-compression of a sample accommodation volume or for driving mobile phase along a flow path.

Still another embodiment is shown in FIG. 12 to FIG. 14.

FIG. 12 shows an embodiment, where one cylinder-piston pair 168 of a dual-piston pump (or a pump with more than two pistons) as fluid drive unit 102 (comprising cylinder-piston pairs 168, 169 and the check valve 167 along with other (not shown) parts) is used for compression of the sample accommodation volume 106 (here a sample loop) via a compression line 166.

In this case a very simple configuration is possible, as shown in FIG. 13a to FIG. 13c and FIG. 13d to FIG. 13f which illustrate two alternatives of valve design. The one cylinder-piston pair 168 used for compression via compression line 166 is configured for being temporarily fluidically or pressure-decoupled from the system flow path (representable e.g. by the mixing point 116) and is different from another cylinder-piston pair 169 of the dual-piston pump or fluid drive unit 102, which may be permanently connected to the system flow path (representable e.g. by the mixing point 116) or flow path 108 (i.e. it may be either a primary cylinder-piston pair of a serial-type dual-piston pump constituting fluid drive unit 102, or either cylinder-piston pair of a parallel dual-piston pump forming fluid drive unit 102 in another embodiment).

Figure 13A:
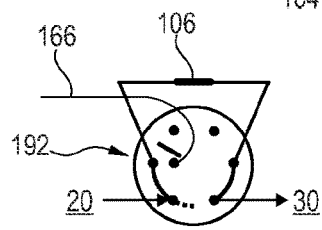
FIG. 13a shows a fluidic valve of the sample separation apparatus according to FIG. 12 in an injection mode.
Figure 13B:
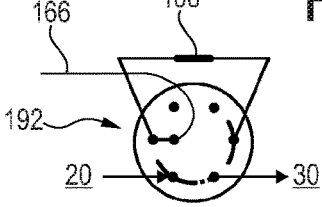
FIG. 13b shows the fluidic valve of FIG. 13a in a compression mode.
Figure 13C:
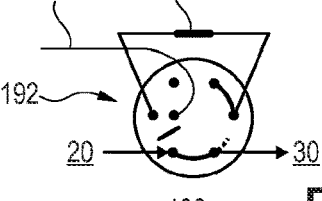
FIG. 13c shows the fluidic valve of FIG. 13a in a sampling phase.
Figure 14A:
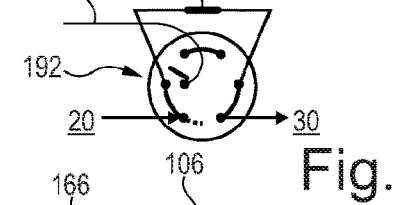
FIG. 14a shows a fluidic valve of the sample separation apparatus according to FIG. 12 in an injection mode.
Figure 14B:
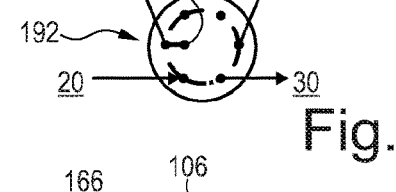
FIG. 14b shows the fluidic valve of FIG. 14a in a compression mode.
Figure 14C:
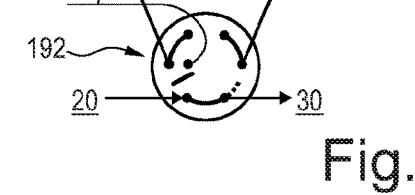
FIG. 14c shows the fluidic valve of FIG. 14a in a sampling phase.
Figure 13D:
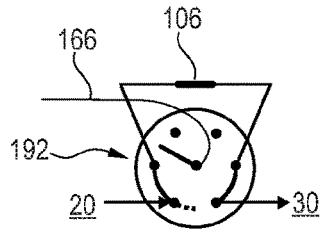
FIG. 13d shows a fluidic valve of another embodiment of the sample separation apparatus according to FIG. 12 in an injection mode.
Figure 13E:
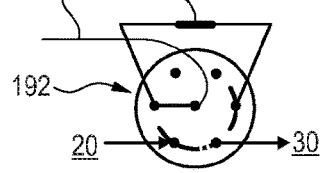
FIG. 13e shows the fluidic valve of FIG. 13d in a compression mode.

In the phase, in which the said cylinder-piston pair 168 is not fluidically coupled to the system/flow path 108 or to the other cylinder-piston pair 169 (here closed check valve 167, being shown as an example for a pressure coupling or decoupling unit, is understood as being in a fluidically decoupled, or "closed" state) the fluidic valve 192 can be switched to the position according to FIG. 13b or according to FIG. 13e.

In this configuration the content of the sample loop or other type of sample accommodation volume 106 can be compressed up to nearly the system pressure (under consideration of the fact, that achieving or exceeding the system pressure value would lead to opening of the check valve 167 in the fluid drive unit 102 and might disturb the composition delivered into the separating unit 30).

Figure 13F:
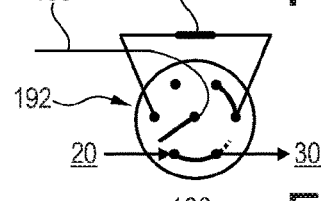
FIG. 13f shows the fluidic valve of FIG. 13d in a sampling phase.
Figure 14D:
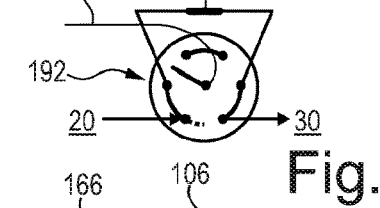
FIG. 14d shows a fluidic valve of another embodiment of the sample separation apparatus according to FIG. 12 in an injection mode.
Figure 14E:
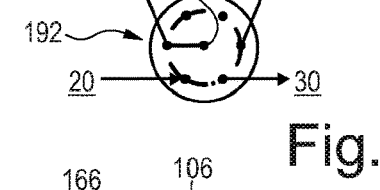
FIG. 14e shows the fluidic valve of FIG. 14d in a compression mode.
Figure 14F:
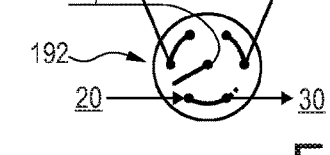
FIG. 14f shows the fluidic valve of FIG. 14d in a sampling phase.

The configurations according to FIG. 13c, and FIG. 13f, respectively, represent the sampling phase, during which the sample accommodation volume 106 is fluidically decoupled from the flow path 108 and the sample can be intaken by a metering unit (not shown) in cooperation with needle-seat junction, for instance as described above referring to FIG. 1.

The configurations according to FIG. 13a, and according to FIG. 13d, respectively, represent the injection phase which is achieved after the compression phase. In this configuration the pumping unit constituted by fluid drive unit 102 can operate normally, and the compressed content of the sample accommodation volume 106 is injected into the system flow path 108 and transferred to the separation unit 30.

By adding further features to the shown fluidic valves 112, 192 (for instance rotary valves) and connecting the check valve 167 of the fluid drive arrangement 20 (here a pump) in series to these additional features rather than parallel, it is possible to completely decouple the cylinder-piston pair 168 used for compression from the other cylinder-piston pair 169 or from the system flow path 108 in the configuration according to FIG. 13b, and according to FIG. 13e, respectively, thus eliminating the possibility of adding solvent from that cylinder-piston pair 168 to the system once the system pressure is exceeded during sample compression.

On the other hand, using an indicator of system flow altering (such as monitoring the system pressure during the sample compression in the configurations according to FIG. 13b, FIG. 13e) it is possible to exactly recognize the event of the sample being compressed up to the system pressure, which is advantageous and may allow to compress the sample exactly to the system pressure without additional pressure sensors. This mode may be especially advantageous, when adding the solvent from the pressurizing cylinder-piston pair 168 to the system flow is tolerable, e.g. if the initial analysis composition is the pure solvent deliverable by that pump channel anyway.

While FIG. 12 and FIG. 13 represent configurations operable with autosampler with a needle-seat unit and high-pressure or low-pressure (i.e. excluded from the high-pressure path) metering unit, FIG. 14 shows configurations which are in particular suitable for operation in 2D-LC or process monitoring. In this case an additional (as compared to FIG. 13) groove in the valve rotor of fluidic valve 192 allows for flow-through filling of the sample accommodation volume 106 by fluid provided in or via a process sample delivery path or by the effluent provided in or via an outlet path of the first dimension of a 2D-LC apparatus. The operation of the configurations in FIG. 14 is similar to that in FIG. 12 and FIG. 13.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A sample separation apparatus for separating a fluidic sample, the sample separation apparatus comprising:
    a fluid drive arrangement comprising a plurality of fluid drive units for driving a mobile phase along a flow path to a sample separation unit;
    a sample accommodation volume configured to accommodate the fluidic sample and being configured to be selectively fluidically coupleable with the flow path or fluidically decoupleable from the flow path; and
    a control unit configured to control respective operations of the fluid drive units, and to control a pressure decoupling of at least one fluid drive unit of the plurality of fluid drive units from the flow path in one operation mode of the sample separation apparatus, wherein the at least one fluid drive unit is controlled to be an at least partially pressure-decoupled fluid drive unit,
    and wherein the control unit is further configured to control an operation of the at least partially pressure-decoupled fluid drive unit, the operation comprising at least one of:
        pressurizing the sample accommodation volume before fluidically coupling the sample accommodation volume with the flow path, wherein the pressurizing is done while at least one other fluid drive unit of the plurality of fluid drive units is operating;
        de-pressurizing the sample accommodation volume after fluidically coupling the sample accommodation volume with the flow path, for preparing a subsequent intake of fluidic sample in the sample accommodation volume, wherein the de-pressurizing is done while at least one other fluid drive unit of the plurality of fluid drive units is operating.

2. The sample separation apparatus according to claim 1, comprising one of the following features:
    wherein the fluid drive arrangement is configured to drive a plurality of different solvents, each of which being assigned to a respective one or to a respective group of the fluid drive units, to be mixed for forming the mobile phase;
    wherein the fluid drive units of the fluid drive arrangement are serially coupled and/or are coupled in parallel and are configured to functionally cooperate for driving the mobile phase before injecting the fluidic sample from the sample accommodation volume in the flow path;
    wherein the fluid drive units of the fluid drive arrangement are configured to functionally cooperate and are coupled, individually or in groups, in parallel for driving the mobile phase before injecting the fluidic sample from the sample accommodation volume in the flow path.

3. The sample separation apparatus according to claim 1, wherein the pressure decoupling of the at least one fluid drive unit comprises pressure decoupling at least one cylinder-piston unit of the at least one fluid drive unit from the flow path while another cylinder-piston unit of the at least one fluid drive unit remains pressure coupled to the flow path.

4. The sample separation apparatus according to claim 3, comprising a pressure coupling or decoupling unit between the one cylinder-piston unit and the other cylinder-piston unit for selectively pressure coupling or pressure decoupling the one cylinder-piston unit with regard to the other cylinder-piston unit, wherein the pressure coupling or decoupling unit is controllable by the control unit.

5. The sample separation apparatus according to claim 1, comprising at least one of the following features:
- the sample separation apparatus is configured as a multidimensional sample separation apparatus;
- the sample separation apparatus is configured as a two-dimensional sample separation apparatus;
- the sample separation apparatus is configured as a two-dimensional liquid chromatography sample separation apparatus;
- the sample separation apparatus is configured as a process monitoring sample separation apparatus.

6. The separation apparatus according to claim 1, wherein the at least partially pressure-decoupled fluid drive unit is configured to compress the sample accommodation volume to a first pressure value substantially corresponding to a second pressure value in the flow path before the sample accommodation volume is switched into the flow path.

7. The separation apparatus according to claim 1, wherein the control unit is configured to fluidically couple the sample accommodation volume with the flow path after the pressurizing.

8. The separation apparatus according to claim 1, wherein the control unit is configured to temporarily fluidically decouple the at least partially pressure-decoupled fluid drive unit from at least one remaining fluid drive unit of the plurality of fluid drive units.

9. The separation apparatus according to claim 8, wherein the control unit is configured to operate the at least one remaining fluid drive unit for supplying mobile phase to the sample separation unit while the at least partially pressure-decoupled fluid drive unit is decoupled from the flow path and pressurizes the sample accommodation volume.

10. The separation apparatus according to claim 1, comprising at least one fluidic valve being switchable by the control unit to thereby selectively switch at least one of the fluid drive units to be pressure coupled with the flow path or to be at least partially pressure-decoupled from the flow path.

11. The separation apparatus according to claim 1, comprising at least one pressure sensor configured to sense information indicative of a pressure of the sample accommodation volume when being pressure-decoupled from the flow path.

12. The separation apparatus according to claim 1, wherein the control unit is configured to switch the fluid drive units in an operation mode in which each of the fluid drive units is fluidically coupled with the flow path and each of the fluid drive units is configured to supply a respective one of a plurality of solvents to be mixed at a mixing point to provide the mobile phase in the flow path, wherein the sample accommodation volume is fluidically decoupled from or coupled with the flow path in this operation mode.

13. The separation apparatus according to claim 1, wherein the control unit is configured to switch the fluid drive units in an operation mode in which at least one of the fluid drive units drives a solvent at least partially towards another one of the fluid drive units, to a mixing point and from there simultaneously towards the sample separation unit and towards another one of the fluid drive units, wherein the sample accommodation volume is fluidically decoupled from or coupled with the flow path in this operation mode.

14. The separation apparatus according to claim 13, wherein the control unit is configured to switch the fluid drive units in another operation mode in which the solvent which has been driven towards the other fluid drive unit is driven by the other fluid drive unit back together with another solvent into the flow path.

15. The separation apparatus according to claim 1, wherein the control unit is configured to switch the fluid drive units into an operation mode in which one of the fluid drive units drives a solvent as mobile phase along the flow path and into the sample separation unit, and at least part of another one of the fluid drive units pressurizes the sample accommodation volume pressure-decoupled from the flow path.

16. The separation apparatus according to claim 1, comprising at least one buffer volume assigned to a respective one of the fluid drive units and being configured to temporarily accommodate solvent of the mobile phase.

17. The separation apparatus according to claim 16, comprising at least one of the following features:
- wherein the control unit is configured to switch the fluid drive units in an operation mode in which the pressure-decoupled fluid drive unit drives solvent into a first buffer volume and displaces its content or part of that into the sample accommodation volume, thus pressurizing the sample accommodation volume, while another one of the fluid drive units drives another solvent into a second buffer volume and displaces its content or part of that to and through the sample separation unit;
- wherein the control unit is configured to switch the at least one buffer volume to be fluidically decoupled from the flow path;
- wherein the control unit is configured to switch the at least one buffer volume to temporarily accommodate a desired solvent composition capable of displacing the solvent with deviant composition or at least partially correcting a discrepancy between an actual composition of the mobile phase and a target composition of the mobile phase in conduits of the sample separation apparatus when the temporarily accommodated solvent is later mixed with the actual composition of the mobile phase.

18. The separation apparatus according to claim 1, comprising at least one of the following features:
- wherein pressurizing comprises increasing a pressure in the sample accommodation volume up to a pressure similar to a pressure upstream of the sample separation unit;
- wherein de-pressurizing comprises decreasing a pressure in the sample accommodation volume compared to a pressure upstream of the sample separation unit;
- wherein de-pressurizing comprises decreasing a pressure in the sample accommodation volume down to ambient pressure;
- the sample separation apparatus comprises a detector configured to detect separated fractions of the fluidic sample;
- the sample separation apparatus comprises a fractioner unit configured to collect separated fractions of the fluidic sample;
- the sample separation apparatus comprises a degassing apparatus for degassing the mobile phase;
- the sample separation apparatus comprises an injector for injecting the fluidic sample into the mobile phase in the flow path between the fluid drive arrangement and the sample separation unit;
- the sample separation apparatus is configured as a chromatography sample separation apparatus.

* * * * *